US012389162B1

(12) United States Patent
Bhandari et al.

(10) Patent No.: US 12,389,162 B1
(45) Date of Patent: Aug. 12, 2025

(54) INTEGRATED MEMS ELECTROSTATIC MICRO-SPEAKER DEVICE AND SYSTEM

(71) Applicant: Vibrant Microsystems Inc., Cupertino, CA (US)

(72) Inventors: Sanjay Bhandari, Cupertino, CA (US); Ali Joseph Rastegar, Palo Alto, CA (US)

(73) Assignee: Vibrant Microsystems Inc., Cupertino, CA (US)

( * ) Notice: Subject to any disclaimer, the term of this patent is extended or adjusted under 35 U.S.C. 154(b) by 216 days.

(21) Appl. No.: 18/187,555

(22) Filed: Mar. 21, 2023

(51) Int. Cl.

| | |
|---|---|
| ***G10K 11/16*** | (2006.01) |
| ***H04R 3/00*** | (2006.01) |
| ***H04R 7/16*** | (2006.01) |
| ***H04R 19/02*** | (2006.01) |

(52) U.S. Cl.
CPC ................ *H04R 7/16* (2013.01); *H04R 3/00* (2013.01); *H04R 19/02* (2013.01)

(58) Field of Classification Search
CPC ............ H04R 7/16; H04R 3/00; H04R 19/02
USPC ................................................ 381/71.1, 71.6
See application file for complete search history.

(56) References Cited

U.S. PATENT DOCUMENTS

| | | | | |
|---|---|---|---|---|
| 5,641,911 | A * | 6/1997 | Ryhanen | G01L 11/008 73/718 |
| 2005/0061770 | A1* | 3/2005 | Neumann, Jr. | H04R 19/005 216/13 |
| 2010/0318205 | A1* | 12/2010 | Ohkuri | H04R 3/002 700/94 |
| 2012/0139050 | A1* | 6/2012 | Yang | B81C 1/00246 257/E21.409 |
| 2017/0167945 | A1* | 6/2017 | Coronato | G01P 15/18 |
| 2020/0374635 | A1* | 11/2020 | Zhou | H04R 19/005 |
| 2020/0413209 | A1* | 12/2020 | Hsu | H04S 7/301 |
| 2021/0064165 | A1* | 3/2021 | Krah | G06F 3/0443 |
| 2022/0369013 | A1* | 11/2022 | Niederberger | H03F 3/45475 |
| 2024/0012966 | A1* | 1/2024 | Kanitkar | G06F 30/27 |

* cited by examiner

*Primary Examiner* — Ammar T Hamid
(74) *Attorney, Agent, or Firm* — Ogawa P.C.

(57) ABSTRACT

In an example, the present invention provides a micro-speaker device. The device has a movable diaphragm device comprising a thickness of silicon or graphene material which has a first surface and a second surface opposite of the first surface and sensor to track position of the diaphragm. The device has a housing enclosing the movable diaphragm device, the electrode device and an encapsulation device. The electrode device can be part of a CMOS device with electronics integrated on to the device that converts input audio signal in to signal that electrostatically actuates the micro-speaker from one or more surfaces.

40 Claims, 9 Drawing Sheets

Cross sectional view of Micro-speaker with current invention

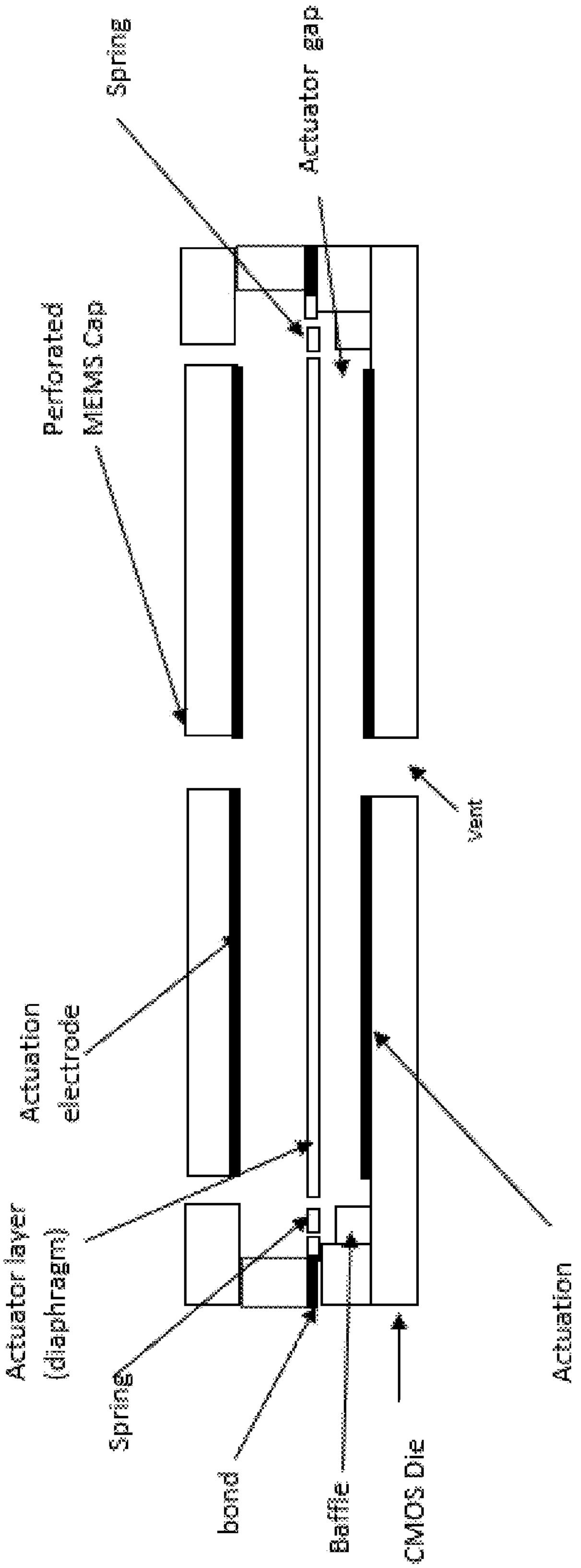
Figure 1 Cross sectional view of Micro-speaker with current invention

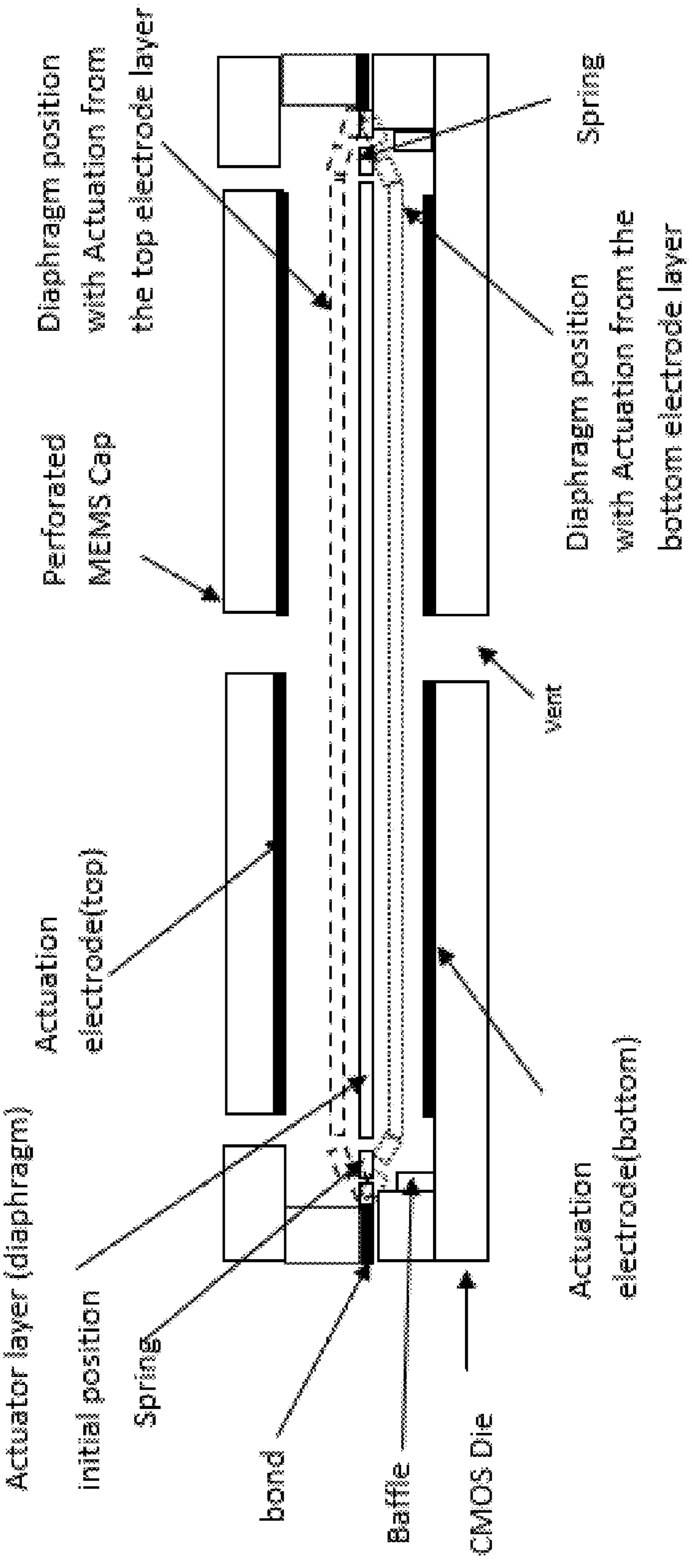
Figure 2 Movement of diaphragm of the Micro-speaker with current invention

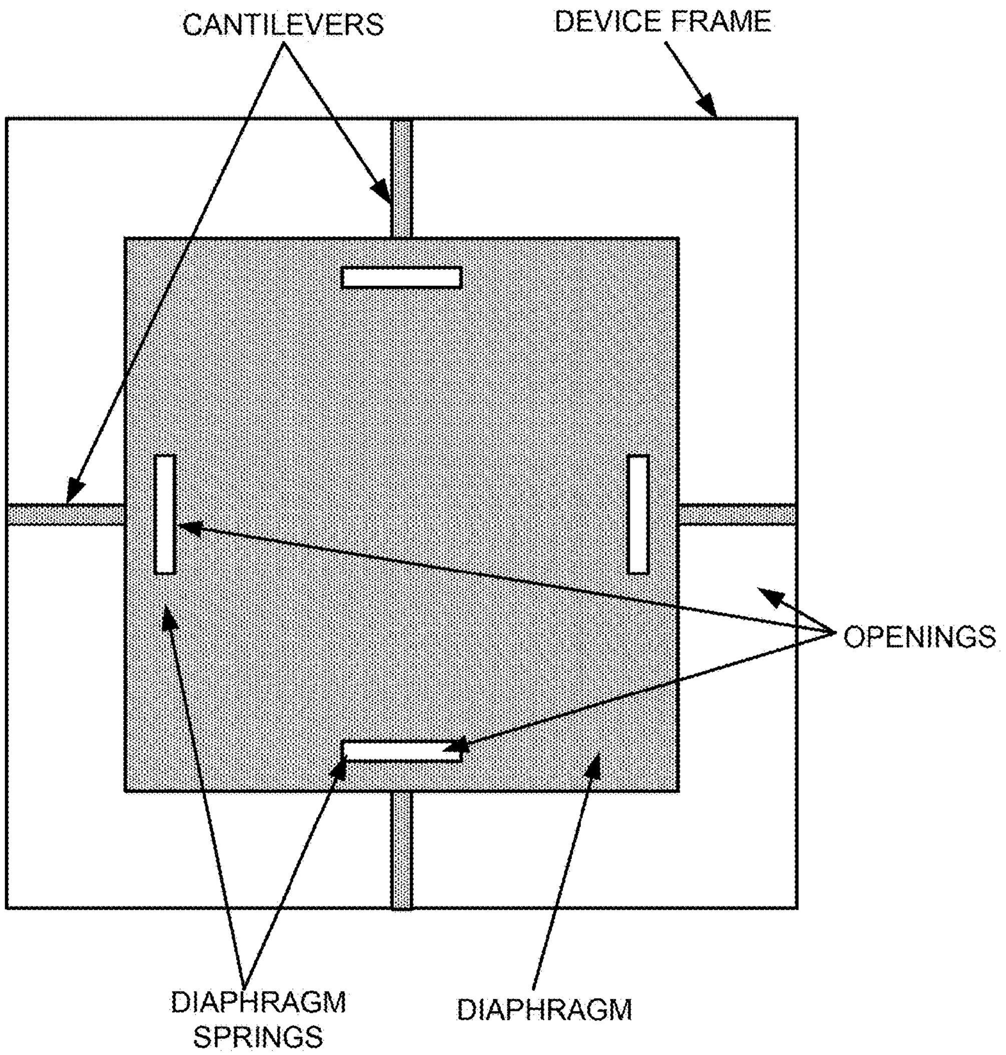
FIGURE 3 EXAMPLE DESIGN OF A DIAPHRAGM OF THE MICRO-SPEAKER WITH CURRENT INVENTION
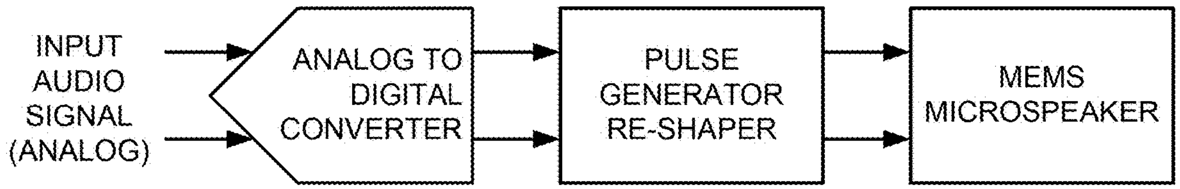
FIGURE 4 EXAMPLE DESIGN OF A SYSTEM ARCHITECTURE WITH ANALOG INPUTS

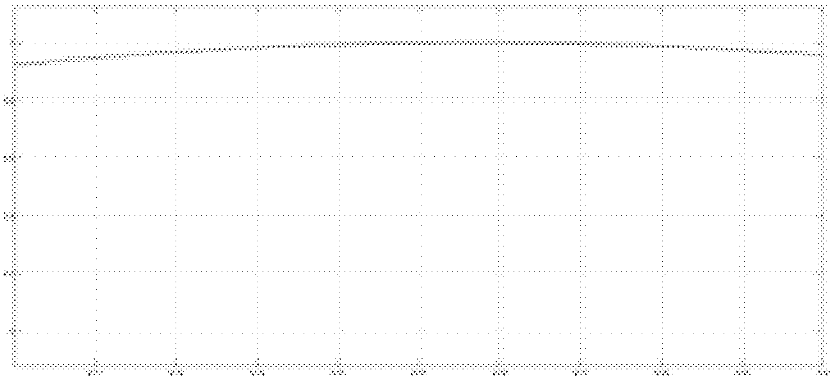
Figure 5A Input signal waveform
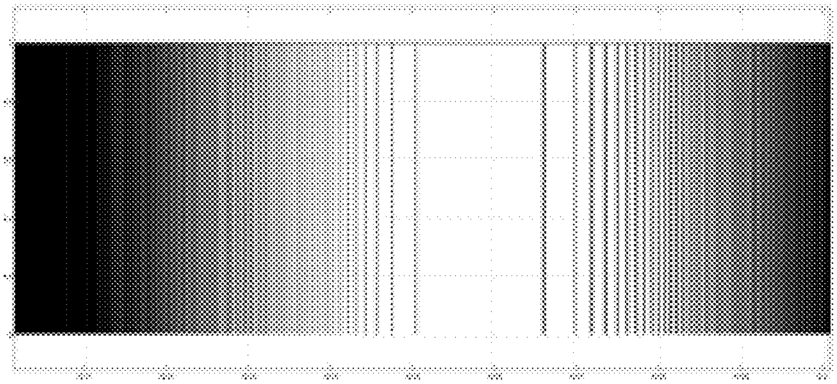
Figure 5B Sigma Delta output
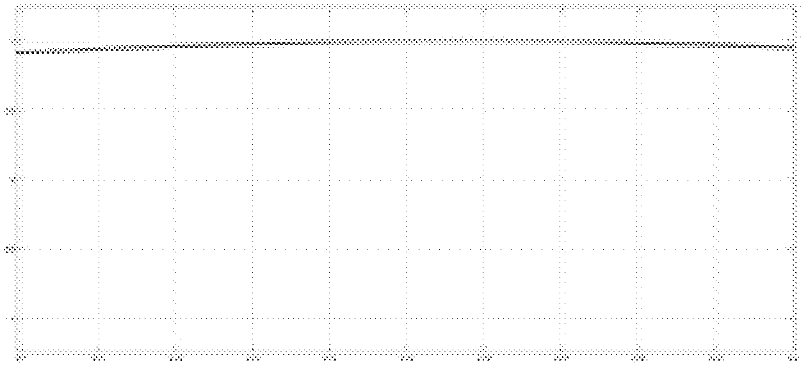
Figure 5C Modeled output waveform from Microspeaker

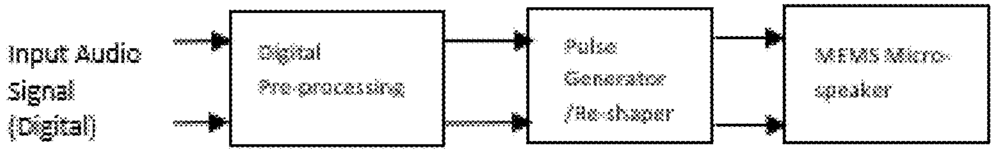
Figure 6 Example design of a System architecture with digital inputs
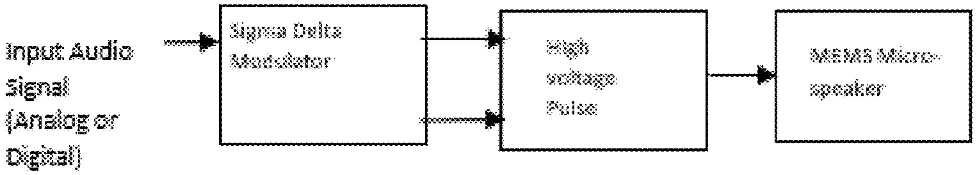
Figure 7 Example design of a System architecture with Sigma Delta Modulator
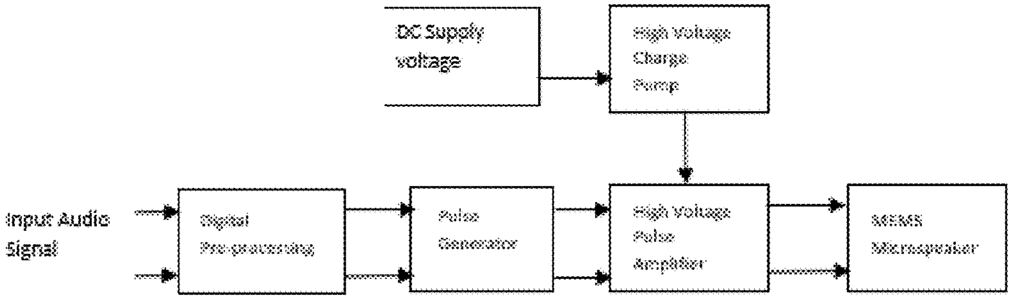
Figure 8 Example design of a CMOS-MEMS Micro-speaker System architecture

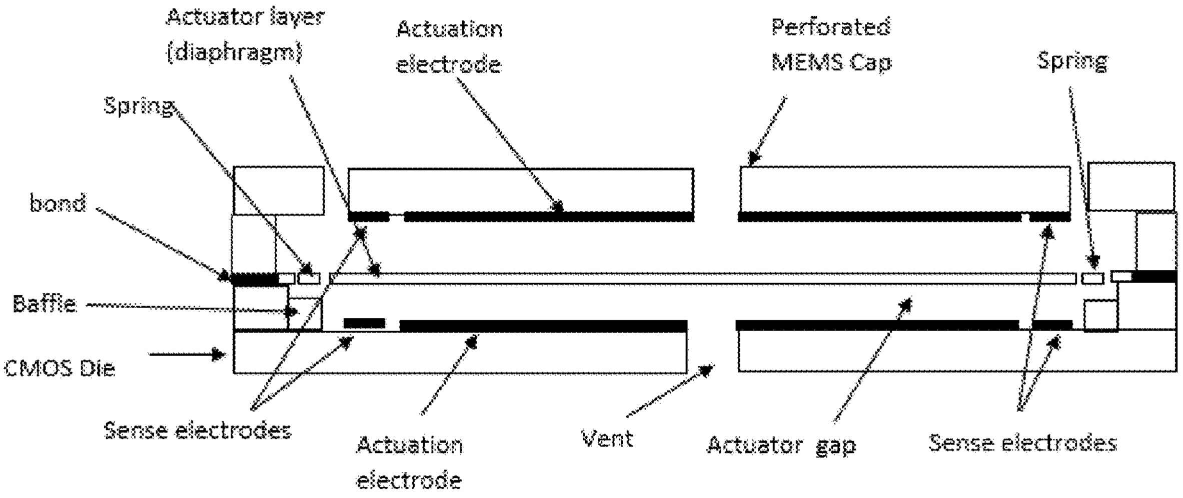
Figure 9 Speaker element vertical stack with sense electrodes
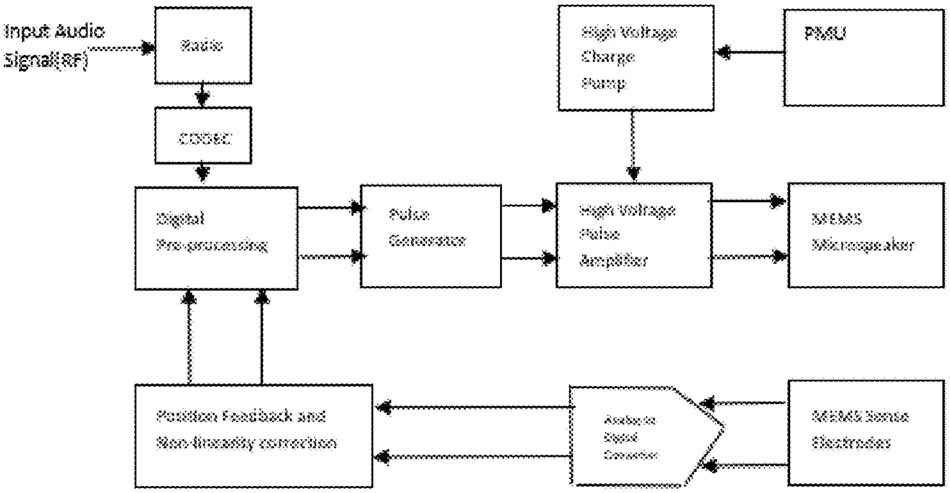
Figure 10 Example System architecture of a CMOS-MEMS Micro-speaker with Microphone

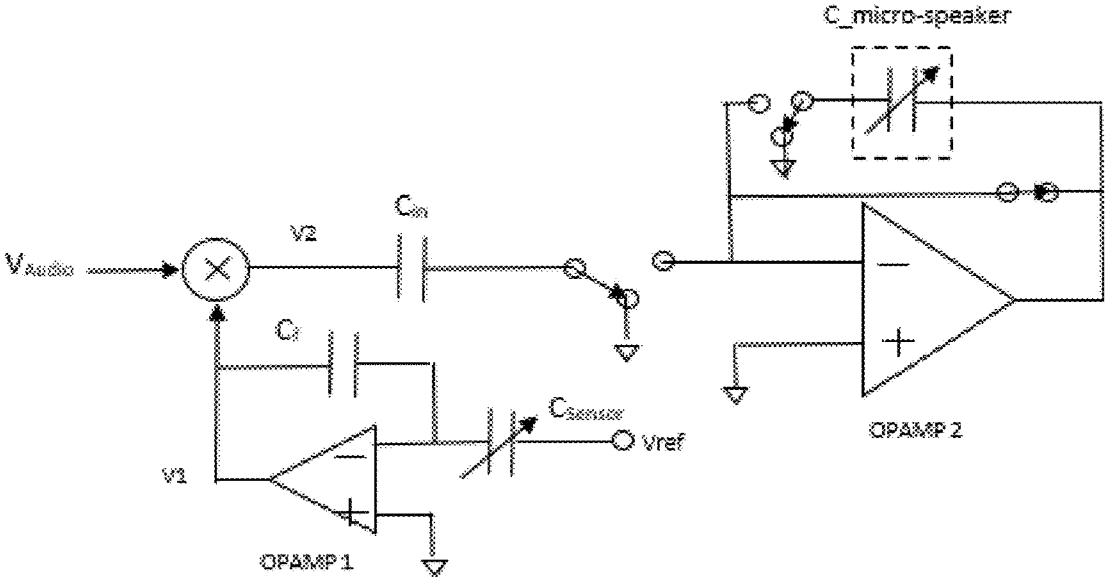
Figure 11 System architecture with charge based driver
| | |
|---|---|
| C1 | C2 |
| C3 | C4 |
| C5 | C6 |
Figure 12 Micro-speaker Array with each speaker cell optimized with different resonance frequency and bandwidth

MICRO-SPEAKER ARRAY ACOUSTIC EQUALIZER

INTEGRATED MEMS ELECTROSTATIC MICRO-SPEAKER DEVICE AND SYSTEM

CROSS-REFERENCE TO RELATED APPLICATIONS

N/A

BACKGROUND OF INVENTION

The present invention is directed to micro electro-mechanical systems, commonly termed "MEMS." In particular, the present invention provides an architecture of a MEMS speaker device and a CMOS architecture for processing signals and MEMS actuator devices. Although the invention has been described in terms of specific examples, it will be recognized that the invention has a much broader range of applicability.

Loudspeakers, also referred to as speaker drivers or speakers, are electro acoustic transducers. A loudspeaker is an essential part of many consumer gadgets such as home music systems, MP3 players, smartphones, laptops, tablets, earbuds, among others. As the miniaturization or reduction of height profile of mobile devices advances, speakers have become smaller in size. As an example, terminology, based on the size of the speaker, typically refers speakers with greater than 4-inch diameters as loudspeakers, 2-4 inch diameter as mini speakers, and less than 2-inch diameter as micro speakers. More recently with the popularity of ear buds, the size of the speakers has decreased to less than 1-inch diameter.

Most of the conventional speakers, however, are still designed with conventional technologies that are based upon the cone speaker, which is configured with a thin moving diaphragm of paper, plastic, or similar material, driven by a spring element which is actuated by electromagnetic signals that are proportional to an audio signal input to the speaker. The conventional speakers use a permanent magnet to generate a magnetic field in which a moving coil driven by electromagnetic force is operated. The conventional speakers are incompatible with any conventional surface mount Printed Circuit Board (PCB) technology which is a disadvantage in the manufacturing flow for Original Equipment manufacturers (OEM) of electronic systems. The conventional speaker technology creates additional constraint on the placement in the speaker inside smartphones, as an example, due to the fact that magnets in the speaker adversely affect other components such as sensors and other electronics. These and other limitations plague conventional speakers and related technologies.

From the above, it is seen that conventional speakers continue to remain as one of the conventional devices that occupy larger spaces in the consumer devices.

SUMMARY OF INVENTION

The present invention is directed to micro electro-mechanical systems, commonly termed "MEMS." In particular, the present invention provides a MEMS speaker device monolithically integrated with a CMOS device to process signals and MEMS actuator devices. Although the invention has been described in terms of specific examples, it will be recognized that the invention has a much broader range of applicability.

In an example, the present invention provides an architecture for micro-speaker device. The device has a movable diaphragm device comprising a thickness of silicon or graphene material having a thickness 0.1 nm to ten microns, but can be others. In an example, the movable diaphragm device has a first surface and a second surface opposite of the first surface. The device has a housing enclosing the movable diaphragm device, the actuator device and an encapsulation device. The device has a vented enclosure opposite of the movable diaphragm. In an example, the vented enclosure may have one or more vent openings to allow air to move in and out of the one or more vent openings to generate a sound pressure signal. In an example, the device has an electrode device coupled to the actuator device to initiate movement of the actuator device in a first direction and an electrode on the cap initiating movement in the second direction.

In an example, the present invention provides an alternative micro speaker device. The device has a movable diaphragm device comprising essentially of a first silicon material, and configured using the first silicon material to generate a variable pressure to output an acoustic signal. In an example, the device has a free standing peripheral region provided in the movable diaphragm device. In an example, the device has an electrode device operably coupled to the actuator device and configured to electrostatically move the actuator device. The device has a third silicon material which form encapsulation and also forms a second electrode device. The device has a housing comprising an inner housing region to enclose the movable diaphragm device, the actuator device, and the electrode device. In an example, the device has a cover device enclosing the inner housing region and overlying the movable diaphragm device.

In an example, the present invention provides architecture that can be implemented in CMOS technology that can process the audio signal and generate electrical signal to drive MEMS actuator that controls the movement of the micro-speaker diaphragm.

Depending upon the example, the present invention can achieve one or more of these benefits and/or advantages. The present invention provides a MEMS Micro-speaker that can reduce the size and profile height of the speaker without affecting the performance. In an example, the present invention can integrate the CMOS audio processing within a monolithic element together with MEMS, thereby miniaturizing the whole audio chain for demanding components such as ear buds, hearables, smart watches and smart phones. In an example, the present invention can be implemented using conventional semiconductor and MEMS process technologies for wide scale commercialization. These and other benefits and/or advantages are achievable with the present device and related methods. Further details of these benefits and/or advantages can be found throughout the present specification and more particularly below.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described examples and the presently understood best mode of the invention are described with additional detail through use of the accompanying drawings in which:

FIG. 1 is a simplified diagram showing a cross-sectional view of a MEMS Micro-speaker designed according to an example of the present invention.

FIG. 2 is a simplified diagram showing the diaphragm with cantilever and springs for the micro-speaker example of the present invention.

FIG. 3 is a diagram showing an example diaphragm with springs and cantilevers according to an example of the present invention.

FIG. 4 is a simplified diagram showing processing of analog audio signal according to an example of the present invention.

FIG. 5A shows a simplified input signal waveform according to an example of the present invention.

FIG. 5B shows a simplified output of one bit Sigma Delta Modulator output according to an example of the present invention.

FIG. 5C shows a simplified modeled output waveform from micro-speaker according to an example of the present invention.

FIG. 6 is a simplified diagram showing processing of digital audio signal according to an example of the present invention.

FIG. 7 is a simplified diagram showing audio signal processed through Sigma Delta Modulator according to an example of the present invention.

FIG. 8 is example of complete system with CMOS plus MEMS architecture according to an example of the present invention.

FIG. 9 is a simplified diagram showing a cross-sectional view of a MEMS Micro-speaker with addition of sense electrodes according to an example of the present invention.

FIG. 10 is a simplified system architecture to with RF audio input, digital signal processing including processing of signals from sense electrodes together with incoming audio signal according to an example of the present invention.

FIG. 11 is another example of CMOS processing to drive MEMS Micro speaker according to an example of the present invention.

FIG. 12 is a simplified diagram of a speaker array with each speaker cell configured with different resonance frequency and bandwidth according to an example of the present invention.

DETAILED DESCRIPTION OF THE EXAMPLES

Figure 13:
FIG. 13 is a simplified diagram of a speaker array acoustic equalizer device according to an example of the present invention.

According to the present invention, techniques directed to micro electro-mechanical systems, commonly termed "MEMS" are provided. In particular, the present invention provides a MEMS speaker device, electronic signal processing and related methods, including MEMS actuator devices. Although the invention has been described in terms of specific examples, it will be recognized that the invention has a much broader range of applicability.

FIG. 1 is a simplified diagram showing a cross-sectional view of the MEMS micro-speaker device according to an example of the present invention. In an example, the device has an electrode layer comprising of one or more electrodes (as shown, and the term "layer" is not limited to single layer but can be interpreted more broadly to include a substrate, including the electrode devices, among other features, or have multiple layers) forms a bottom structure of the micro-speaker device. The substrate layer may comprise of a CMOS die includes some or all of the electronics for operating the MEMS micro-speaker, including processing of a plurality of audio signal, actuation of an actuator device for the MEMS, sensing of the MEMS movement, including diaphragm device, electronic damping, feedback, and other electronic circuits.

As shown, the electrode layer may have a vent hole (or a plurality of vent regions) to allow air movement there through created by the diaphragm coupled to the actuator device. The vent hole or holes also leads to a larger back volume for the backside of the diaphragm (where the front side is opposite of the backside, although the term front side and back side are intended to be used in reference to each other and may have other terms.

In an example, the electrode layer may be a CMOS die which will have one or more metal layers. Part of the top metal layer will be used as electrostatic actuator to implement one or more electrodes. In an example, the metal actuator can be symmetrically placed or configured using other spatial configurations. The metal actuator will be driven by an electrical signal that may have DC as well as AC component. Voltage of the actuator generates an electrostatic force on the MEMS layer above an actuation area, which includes the actuator device.

The 'Actuator Layer', also referred as the MEMS layer or diaphragm layer (each of which the term layer is not limited to a single layer but can include multiple layers and related structures) is shown as multiple elements in FIG. 1.

The MEMS layer comprises a diaphragm designed to have up and down motion (towards and away from the CMOS actuator metal). The diaphragm is connected to the frame or anchor by using MEMS springs or beams or cantilevers. The springs may have cantilever action and or torsional force or a combination of the both forces. The MEMS region directly above the metal actuator electrode will move vertically due to the electrostatic force. This force can attract the MEMS actuator, pulling it closer to the metal surface. The spring also helps in restoring the diaphragm to its original position where there is minimal tension in the spring. There is a gap between moving MEMS element in the actuation area and the metal actuation layer. A smaller gap would exert more electrostatic force than a larger gap. The actuator gap is designed based on the desired movement of the MEMS, the desired electrostatic force, and damping forces.

The MEMS diaphragm in the speaker area may also be connected with certain voltage. This voltage is designed such that the electrostatic forces are maximized.

With an electrostatic force applied from the metal plate on CMOS, the MEMS actuator region in the actuation area will be electrostatically attracted toward the metal plate, thereby pulling it down if the force is attractive. When the electrostatic force from the metal actuator ceases to exist, the diaphragm will move up.

In this invention, the cap wafer or its inner surface layer such as metal, may also be driven by a voltage proportional to the audio voltage driving the speaker. If the spacing of the actuator layer from the cap and the CMOS actuation regions are designed to be the same then the force on the actuator layer can become proportional to the applied voltage. Applying an electrostatic actuation from both the cap side and the CMOS side helps in increasing the total force and allows motion of the actuator in both directions. In an example of the invention, the cap wafer can be Silicon on Insulator where the outer surface is not connected to any potential (or signal) but the SOI silicon is driven by a signal. In another example, the cap wafer will have metal actuation electrode which will be driven by a voltage to attract the diaphragm. The cap wafer will create electrostatic force similar to the actuation layer on the CMOS but opposite in phase The vertical up and down movement of the diaphragm is proportional to the audio signal applied to the MEMS speaker cell. The up and down motion pushes air thereby creating sound waves.

The diaphragm can be made of silicon, graphene or a combination of different material. Vertical motion of the diaphragm pushes air up. The motion of the diaphragm and the pressure it transmits to the outer environment is proportional to the audio input, thereby acting as a speaker.

The baffles prevent back air pressure from mixing with the front air waves.

The top of the cap may have additional protective material as a barrier to the electrical conductivity, humidity, moisture or dust particles but allow audio waves to pass through.

The spring constant, dimensions of the beam connecting to the actuator layer acting as a piston and the area and mass of the diaphragm can be designed to obtain the resonance of the MEMS at a desired frequency. At the resonant frequency, the movement of the diaphragm will be maximum. On the other hand, the dimensions and mass can be optimized to obtain a flatter frequency response for a desired frequency bandwidth.

In other examples, the MEMS cap can include a plurality of perforations. Also, the device has a bonding layer coupling the CMOS substrate to the upper actuator structure. The cap layer is also bonded in an example.

FIG. 2 is a simplified illustration of a Finite element simulation that shows the movement of the diaphragm with electrostatic actuation. The colors or shades in FIG. 2 represent different level of displacement from the original position after an electrostatic actuation is applied from the electrode layers. The vertical up and down movement of the diaphragm is proportional to the audio signal applied to the MEMS speaker cell. The up and down motion pushes air thereby creating sound waves.

FIG. 2 also shows an example of how the moving silicon diaphragm is connected to the frame of the micro-speaker device and an example of the springs used. The diaphragm can be made of silicon, graphene or metal or a combination of different materials. Vertical motion of the diaphragm pushes air up. The motion of the diaphragm and the pressure it transmits to the outer environment is proportional to the audio input, thereby acting as a speaker.

In an example, baffles are added to prevent back air pressure from mixing with the front air waves. It also allows protecting the MEMS layer and the silicon from external particles.

The top of the diaphragm may have additional protective material to prevent humidity, moisture or dust particles but allow audio waves to pass through.

The spring constant, the cantilever and spring dimensions and the area and mass of the diaphragm can be designed to obtain the resonance of the MEMS at a desired frequency. At the resonant frequency, the movement of the diaphragm will be maximum. On the other hand, the dimensions and mass can be optimized to obtain a flatter frequency response for a desired frequency bandwidth.

There can be one or more holes in the diaphragm to mitigate squeezed film damping and increase the resonant frequency and bandwidth of the speaker. The holes can also help in certain process steps in the fabrication of the speaker.

FIG. 3 shows an example of the diaphragm designed in the micro-speaker of the current invention. The cantilevers or springs are used to attach the diaphragm with the frame of the micro-speaker and are formed by etching openings through a diaphragm layer.

FIG. 4 shows an example of actuating the speaker. In this example, an analog audio signal is fed to the speaker system. The analog signal is converted to digital using an Analog to Digital (A/D) converter. In an example, this A/D converter is implemented using Sigma-Delta Modulator (SDM) A/D architecture which can generate one bit Sigma Delta output which is a digital signal at higher modulation frequency. With the one bit SDM, the Pulse generator block can either re-shape the pulse such as amplification to higher voltages or filtering such as a first order low pass filter. The output of the Pulse generator drives the MEMS actuator which can pull the Micro-speaker diaphragm described in earlier illustrations.

FIG. 5 shows various waveforms in the example shown in FIG. 4. In this illustration, an analog signal as shown in FIG. 5A is fed as analog input to a one bit Delta Sigma Modulator A/D converter. FIG. 5B shows output of the SDM block. The Pulse generator/Re-shaper block can be used to amplify the pulses. For example, if the SDM output is from 0 to 3V signal levels, the Pulse re-shaper can amplify them to 0 to 20V maintaining the duty cycle of the pulses. The Pulses drive the MEMS actuator. With the potential difference between MEMS diaphragm voltage and the actuator voltage, the MEMS diaphragm can be pulled in proportional to the square of the applied voltage. The expected audio output from the Micro-speaker is also shown in FIG. 5C, which will be replication of the applied analog signal, delayed by time equal to the processing delay in the signal chain. The signal propagation delay is usually very small (in microseconds or milli-seconds) which do not affect function of the Micro-speaker operation.

FIG. 6 shows a system where a digital signal is input to the Micro-speaker system. The Digital processing block can apply pre-processing such as noise shaping or filtering or other such functions. In an example, when a M-bit digital audio signal is applied, the digital processing can apply noise shaping with Sigma Delta modulation to improve the signal to noise ratio. It can also generate a one bit SDM output at a higher modulated frequency. For example, when the audio signal bandwidth is 20 KHz, the single bit SDM output can be in hundreds of Kilo Hertz to several Mega Hertz range. The single bit digital output from SDM can then be processed through Pulse re-shaper which can amplify the voltages to higher voltages such as several tens of volts which can be applied to the MEMS actuator.

Another example of the Pulse generator blocks in FIG. 4 and FIG. 6 can use modulation such as Pulse Width Modulation (PWM) with or without using SDM.

FIG. 7 shows system where the input audio signal, whether it is analog or digital, is processed with Sigma Delta Modulator (SDM). The SDM helps is noise shaping to improve Signal to Noise of the signal. A one or more bit output from SDM is then used to drive MEMS micro-speaker. In an example, the SDM output pulses are processed through a stage that makes the pulse voltages higher in order to driver the MEMS micro-speaker with higher amplitude. The High voltage may be generated by using high voltage inverter such as Lateral DMOS inverter or a similar high voltage capable circuit.

FIG. 8 shows additional elements in the example of the architecture. From the nominal supply voltages, for example 1.8V or 3.3V, a charge pump generates a higher boosted voltage such as 30V. This boosted voltage is used by the High voltage Pulse amplifier to generate pulses with signal levels that are large, for example 0 to 30V.

In an example, the high voltage pulse amplifier is simply a high voltage inverter. In an example implementation, the high voltage inverter can be implemented using Laterally Diffused MOS or LDMOS transistors. FIG. 9 shows an example where there are additional electrodes that can be created on the CMOS layer as well as the cap layer. The electrodes marked as 'sense electrodes' are used to track the capacitive change created by the displacement in the position of the diaphragm and MEMS proof mass. On Application Specific Integrated Circuit (ASIC), this change in capacitance can be tracked to sense the precise position of the MEMS proof mass and the diaphragm. The electrical signal created, which can be proportional to the MEMS proof mass displacement, can be used for controlling damping or non-linearity compensation.

FIG. 10 shows a complete CMOS architecture. The input signal can be wireless such as Bluetooth (BT) or other wireless technologies. The incoming signal is decoded through on chip CODEC. Additional Digital signal processing such as noise shaping filtering is applied. The signals are converted, as described in previous illustrations, to generate higher voltages pulses that drive MEMS actuator. The sense terminals, sense the displacement of the MEMS diaphragm using a Analog to Digital converter (ADC). In an example, the ADC will be implemented as SDM A/D converter. The sensed voltage is used in a feedback loop configuration to correct no-linearities in the audio waveform such as improved harmonic distortion. The feedback can also be used of active noise cancellation. A Power Management Unit (PMU) generated the required voltage rails on the chip. A high voltage charge pump generates the higher voltage such as 20V to 40V that can be used to drive the MEMS micro-speaker.

The sense electrodes can implement a capacitive microphone where the movement of the diaphragm in a cavity formed between diaphragm and sense electrode creates a capacitance. This capacitance varies with movement of the diaphragm thereby acting as a MEMS microphone.

The pulses generator shown in FIG. 4, FIG. 6, FIG. 7 and FIG. 8 can generate pulses to drive MEMS actuators from the CMOS side as well as from the Cap side, in opposite phases. For example, when the CMOS actuator plate is at 0V, the actuator plate from cap side will be at high voltage such as 30V and vice versa to facilitate larger diaphragm motion.

The charge pump shown in FIG. 7 and FIG. 8 can also generate a high positive voltage and a high negative voltage. For example, the high positive voltage can be +20V when the high negative voltage is −20V. Using such a bipolar supply, the pulses generated can also swing from negative maximum to positive maximum. The pulses applied to actuation electrode from the CMOS electrode will be driven opposite (180 degrees out of phase) to the pulses applied to the cap actuation electrode. This helps in applying a larger differential voltage to the MEMS diaphragm at the same time, maintaining a average voltage at 0V.

FIG. 11 shows another example of driving the MEMS micro-speaker. Capacitance C_sensor is capacitance of the sensor elements created as shown in FIG. 9 to sense the position of the diaphragm. As the position of the diaphragm changes with movement, C_sensor changes accordingly. Opamp 1 has negative input terminal connected to reference voltage Vref through capacitor C_sensor. A feedback capacitor Cf is connected between negative input of Opamp 1 and its output. Opamp 1 generates a voltage V1, proportional to the reference voltage Vref and the movement of the diaphragm. This voltage is multiplied with the input audio signal to generate voltage V2. In the switch positions shown with solid lines in FIG. 11, capacitor Cin will be charged to V2 multiplied by Cin. When the position of the switches are changed to dotted position, this charge is transferred to micro-speaker shown with a capacitance Cspeaker in FIG. 11. This example implementation shows how a micro-speaker is driven with a fixed charge since both Csensor and Cspeaker will change in proportion to diaphragm movement.

FIG. 12 shows a speaker array where multiple such speakers cells are placed next to each other. For example, a speaker cell C1 in FIG. 5 can have a resonance frequency at frequency F1, cell C2 at frequency F2 and so on. The resultant frequency response of the combined system can be optimized to achieve an overall wide band frequency response or have a boost in the band of interest.

FIG. 13 shows how multiple speaker cells can also be optimized to create an audio 'equalizer'. Each cell or multiple cells can be optimized to cover bass, mid-band, and Treble frequency responses. An user can then adjust the equalizer to a desired setting, including one of a plurality of parameters.

Figure 14A:
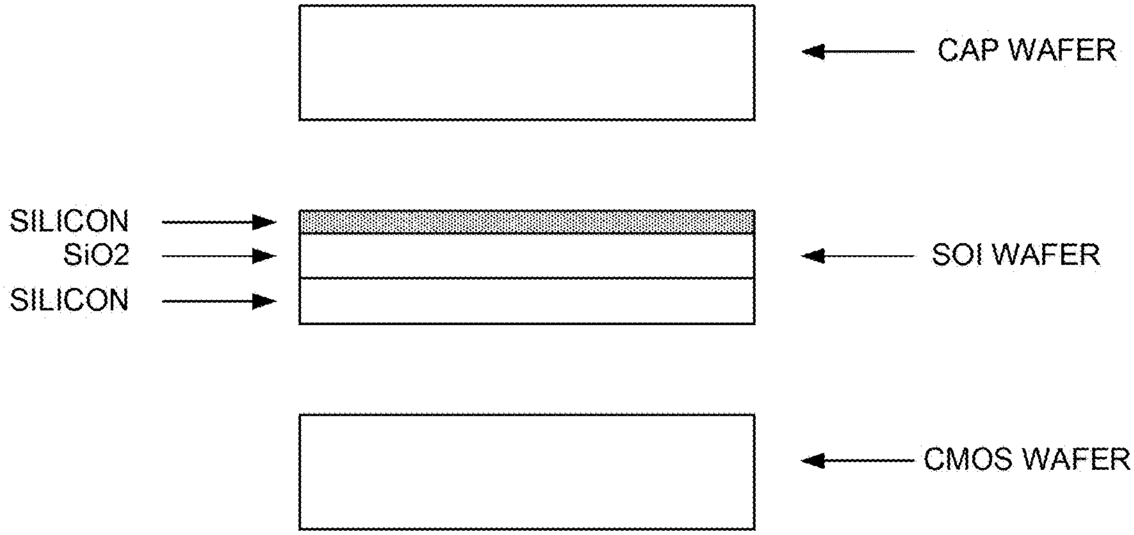
FIGS. 14A, 14B, and 14C illustrate a process for fabricating a micro speaker device according to an example of the present invention.

FIG. 14A is a simplified diagram illustrating a process starting point with (i) Bottom-unprocessed CMOS wafer (ii) Middle-SOI wafer with thin silicon on top of insulator (e.g., silicon dioxide) and bottom Silicon substrate (iii) top-unprocessed Cap wafer. In an example, each of the wafers can be made using a silicon material, although there can be others.

Figure 14B:
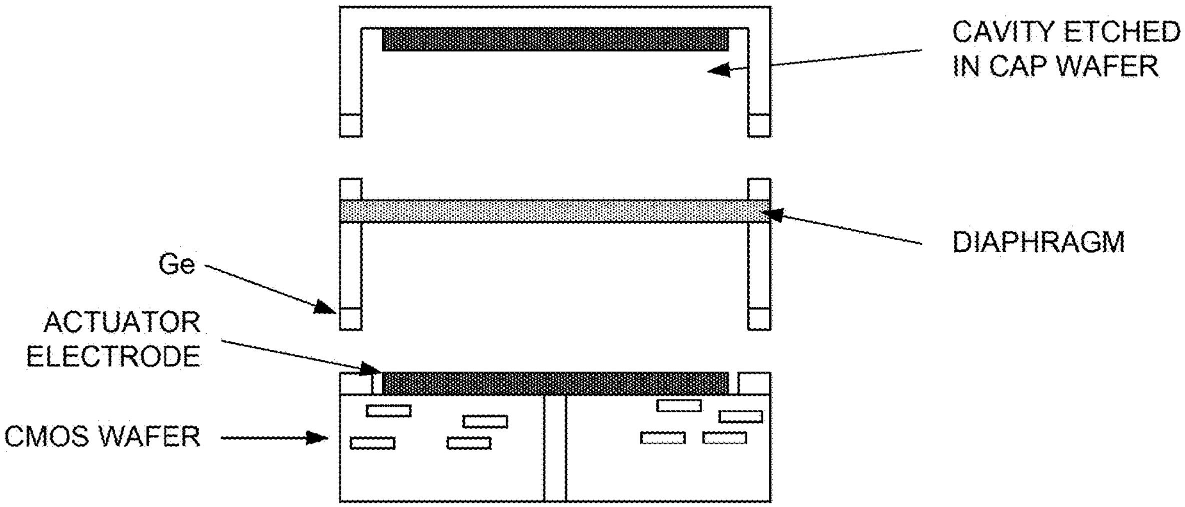

FIG. 14B is a simplified diagram illustrating processed wafers (i) Bottom-processed CMOS wafer with actuation electrodes (ii) Middle-SOI wafer where a first silicon layer defines the diaphragm and the second silicon layer forms the posts where metal such as Aluminum or Germanium can be deposited for bonding this layer with the CMOS layer and with the cap layer (iii) top-processed Cap wafer where a cavity is etched and as an example, metal is deposited to act as top electrode layer. As shown, the bottom wafer includes CMOS cells, and a plurality of electrode devices. In an example, the bottom wafer includes edge posts, among other features. As shown in the middle SOI wafer, the device includes germanium deposited for bonding with the bottom CMOS wafer, and also includes germanium material for coupling to the cap wafer. The cap wafer includes a recessed region to form a cavity. Of course, there can be other variations, modifications, and alternatives.

Figure 14C:
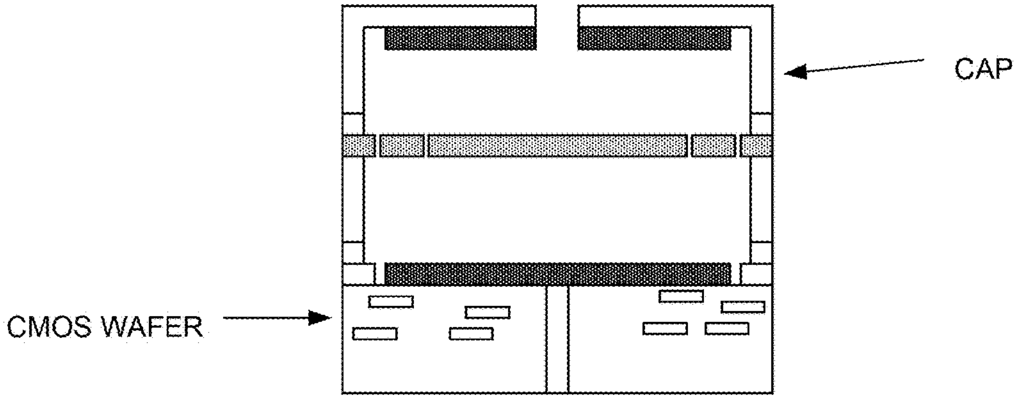

FIG. 14*c* is a simplified diagram illustrating a processed micro speaker (i) Bottom-processed CMOS wafer with actuation electrodes bonded with Middle-SOI wafer, etch for diaphragm layer to release it, bonded with Cap wafer where vent hole(s) are etched. As shown, the multiple substrates (e.g., bottom, middle, and top) are configured with each other in a multi-layered bonded structure in an example. Of course, there can be other variations, modifications, and alternatives. Further details of the present device and related method can be found throughout the present specification and more particularly below.

In an example, the present invention provides a MEMS actuator layer serving the function of a movable diaphragm layer, connected to at least one spring and an electrode layer with at least one electrode that can electrostatically controls the movement of the actuation layer and an encapsulation layer that forms a top layer of the device where the diaphragm is electrostatically activated by activating the electrode from CMOS and from the electrostatic force from the cap wafer forming a speaker cell where one or more such cells act as a micro-speaker.

In an example, the speaker includes combining multiple micro speaker cells in an array to create a wider band flat frequency response. In an example, the multiple speaker cells are driven at different phases can shape the physical sound travel and hence optimize the sound in ear. In an example, the speaker includes combining multiple micro speaker cells to create frequency boost at a desired single or multiple bands of frequencies. In an example, the speaker is configured by applying different signal processing to each speaker cell to create frequency boost and desired combined sound effects. In an example, the speaker includes combining multiple micro speaker cells to create audio equalizer with user defined optimization for the bass, mid-band and treble frequencies or for a finer granular control across the audio frequency band like a music equalizer. In an example, speaker can adapt by use of software to be customized for an individual or individual car for best sound experience.

In an example, the CMOS circuit and related substrate have a vent hole to achieve desired acoustical response. In an example, invention includes a system on a single monolithic chip that includes a speaker cell with moving element diaphragm to create audio frequencies, a CMOS circuit that pre-processes an audio signal to electrostatically apply force on a MEMS element and integrates audio processing and a cap layer to protect the device and apply electrostatic force. In an example, the audio processing includes Analog to Digital Conversion (A/D). In an example, the audio processing includes Sigma Delta A/D conversion to generate a 1-bit output. In an example, the audio processing includes Pulse Width Modulation (PWM). In an example, audio processing includes generating high voltage pulses from one voltage to another voltage. In an example, the audio processing includes generating pulses that drive the actuation electrodes from CMOS circuit and the cap layer. In an example, the CMOS circuit implements charge pump to boost voltage from a lower supply voltage to the desired higher voltage. In an example, the CMOS circuit implements charge pumps to boost voltage from 0 to high voltage and 0 to negative high voltage. In an example, the audio processing includes analog filtering. In an example, the audio processing includes digital filtering.

In yet another example, the invention provides a complete system on a single monolithic chip that includes a speaker cell with moving element diaphragm to create audio frequencies, a CMOS circuit that pre-processes an audio signal to electrostatically apply force on a MEMS element and integrates audio processing, a microphone cell with moving element diaphragm to generate a capacitive change, a sense amplifier and A/D converter to sense the motion and a feedback circuit to use the sense signal and the audio signal to reduce non-ideal behavior. In an example, the feedback circuit is configured to reduce harmonic distortion. In an example, the feedback circuit is configured to implement active noise cancellation.

Moreover, the invention provides a MEMS Actuator layer serving the function of a movable diaphragm layer, connected to at least one spring and an electrode layer with at least one electrode that can electrostatically controls the movement of the actuation layer and an encapsulation layer that forms a top layer of the device where the diaphragm is electrostatically activated by activating the electrode from a CMOS circuit and from the electrostatic force from the cap wafer forming a speaker cell, a sense electrode created on the first substrate or the second surface to sense the position of the diaphragm, and the CMOS circuit configured to use the capacitance from the sense electrodes to drive micro-speaker with a charge to drive the actuator. The CMOS circuit is configured to using a capacitance from the sense electrodes to drive micro-speaker with precisely known charge to extend the range of actuator. The CMOS circuit is configured to include fully differential circuits to reduce noise. In an example, the CMOS circuit is calibrating the drive charge based on the geometry of the actuator and the sensing device. In an example, the CMOS circuit is configured using op-amps to reduce effect of parasitic. In an example, the CMOS circuit includes the speaker that driven in a switched capacitor configuration.

In an example, the present invention provides a system on a chip device, e.g., silicon chip. The device has a monolithically integrated speaker cell having a moving element diaphragm configured to create one or more audio frequencies. The device has a CMOS integrated circuit configured to pre-processes an audio signal to output an electrostatic force on the moving element diaphragm and to integrate an audio processing circuit. The device has a cap layer enclosing the monolithically integrated speaker cell for protection; and configured to generate an electrostatic force to the moving element diaphragm.

In an example, the device has other elements. For example, the audio processing circuit includes an Analog to Digital Conversion (A/D). The audio processing circuit includes a Sigma Delta A/D conversion to generate a one bit output. The audio processing circuit includes a Pulse Width Modulation (PWM) circuit. The audio processing circuit is configured to generating one or more high voltage pulses from a first voltage to a second voltage. The audio processing circuit is configured for generating a plurality of pulses to provide voltage to one or more electrodes and for the cap layer. In an example, the audio processing circuit includes an analog filtering circuit. In an example, the audio processing circuit includes a digital filtering circuit.

In alternative examples, the CMOS integrated circuit comprises a charge pump to boost voltage from a lower supply voltage to a desired higher voltage. The CMOS integrated circuit comprises a charge pump to boost voltage from a low voltage to a desired high voltage and zero or positive voltage to a negative desired high voltage.

Furthermore, the present invention provides a system on a single monolithic integrated chip device. The device has a speaker cell comprising a moving element diaphragm to create one or more audio frequencies. The device has a CMOS device configured to pre-process an audio signal and configured to generate a signal to electrostatically apply a force coupled to the moving element diaphragm. In a preferred example, the CMOS device further comprises one or more circuits configured for audio processing. The device also has a microphone cell coupled with the moving element diaphragm to generate a capacitive change and a sense amplifier configured with the moving element diaphragm to detect a magnitude of the capacitive charge. The device has an analog to digital converter configured to sense a motion of the moving element diaphragm and generate a sense signal and a feedback circuit coupled to the analog to digital converter and configured to detect the sense signal and the audio signal to reduce a non-ideal behavior of the audio signal.

In an example, the feedback circuit is configured to reduce the non-ideal behavior comprising a reduce harmonic distortion. In other examples, the feedback circuit is configured for active noise cancellation.

Moreover, the present invention provides a speaker device. The device has a MEMS actuator layer configured to function as a movable diaphragm device coupled to at least one spring and an electrode material comprising at least one electrode device. The electrode device is configured to electrostatically move the movable diaphragm device. The device has an encapsulation region comprising a cap configured to form an upper region over the movable diaphragm device, and configured to form an electrostatic force to move the movable diaphragm device. The device has a sense electrode provided overlying a first substrate or a second surface to determine a spatial position of the movable diaphragm device. The device has a CMOS integrated circuit coupled to the first substrate and coupled to the sense electrode to use a capacitance from the sense electrodes to proportionately drive the movable diaphragm device with an accumulated capacitive charge such that a magnitude of an applied electrostatic force is compensated as the movable diagram device moves spatially closer in distance to the electrode device thereby increasing a dynamic range output from a first predetermined value to a second predetermined value and a pull in range from a first value to a second value of the movable diaphragm device.

In an example, the capacitance from the sense electrode proportionately scales the charge applied to the movable diaphragm device to extend the dynamic range of movable diaphragm and prevent pull in of the movable diaphragm. In an example, the CMOS integrated circuit comprises a fully differential circuit to reduce noise from a first level to a second level. In an example, the accumulated capacitive charge is configured from a spatial geometry of the movable diaphragm device and the sense electrode. In an example, the CMOS integrated circuit comprises a plurality of op-amps to reduce effect of parasitic current. In an example, the movable diaphragm device is driven using a switched capacitor configuration.

Of course, there can be other variations, modifications, and alternatives.

While the above is a full description of the specific examples, various modifications, alternative constructions and equivalents may be used. As an example, the packaged device can include any combination of elements described above, as well as outside of the present specification. Therefore, the above description and illustrations should not be taken as limiting the scope of the present invention which is defined by the appended claims.

The invention claimed is:

1. A micro-speaker device comprising:

a movable diaphragm device comprising a silicon material having a thickness within a range of 0.1 nm to 10 microns, the movable diaphragm device having a first surface and a second surface opposite of the first surface, the movable diaphragm device being connected with at least one cantilever or springs to an anchored area, the first surface of the movable diaphragm device comprising an actuator device that is electrostatically coupled to a first substrate to pull the movable diaphragm device, wherein the at least one cantilever or springs are formed in the silicon material in response to openings through the silicon material;

a housing enclosing the movable diaphragm device, the at least one cantilever or spring, and an actuator device;

a vented cavity enclosing the movable diaphragm device and having one or more vent openings to allow air to move in and out of the one or more vent openings to generate a sound pressure signal;

an electrode device coupled to the first substrate to initiate movement of the actuator device in a first direction;

a CMOS or bipolar circuit coupled to the movable diaphragm device or to the electrode device and configured to receive an audio input, to processes a signal associated with the audio input, and to generate an output signal to drive the movable diaphragm or to the electrode device or both to form an electrostatic force between the actuator device and the electrode device; and a sense electrode configured coupled to the first substrate to sense a position of the movable diaphragm.

2. The device of claim 1 wherein the at least one cantilever or springs comprise a cantilever and a spring;

wherein the movable diaphragm is characterized by an out of plane motion; and wherein the housing is characterized by an opening dimension of 100 micrometers and less.

3. The device of claim 1 wherein a portion or an entirety of the CMOS or bipolar circuit is monolithically integrated with movable diaphragm.

4. The device of claim 1 wherein the audio input is received in a Bluetooth wireless format using a receiver.

5. The device of claim 1 wherein the audio input is received in wired format.

6. The device of claim 1 wherein the CMOS circuit includes an Analog to Digital converter and a pulse generator to generate the output signal to drive the movable diaphragm device.

7. The device of claim 1 wherein the CMOS circuit includes a Delta-Sigma modulator for generating a one bit digital output to generate the output signal to drive the movable diaphragm device.

8. The device of claim 1 further comprising a high voltage amplifier device configured to apply one or more pulses to the movable diaphragm device.

9. The device of claim 1 further comprising an inverter device configured to apply one or more pulses to the movable diaphragm device.

10. The device of claim 1 further comprising an LDMOS device configured to apply one or more pulses to the movable diaphragm device.

11. The device of claim 1 further comprises a Pulse Width Modulator (PWM) configured to apply one or more pulses to the movable diaphragm device.

12. The device of claim 1 further comprising a high voltage generated using a high voltage charge pump configured to boost a voltage from a lower supply voltage to a higher voltage on a portion of a substrate.

13. The device of claim 1 wherein one or more of the dimensions of the at least one spring, mass of the movable diaphragm device are charactered by a resonance at a desired frequency and a desired frequency response.

14. The device of claim 1 wherein the CMOS circuit is configured to adjust the signal associated with the audio input to optimize a frequency response.

15. The device of claim 1 wherein the second surface of the movable diaphragm device is electrostatically coupled to a second surface to pull the movable diaphragm device in direction opposite of the first surface.

16. The device of claim 1 wherein the sense electrodes are configured to measure and track a spatial position of the movable diaphragm.

17. The device of claim 16 wherein the CMOS circuit is configured to reduce non-ideal behavior, non-linearities, and/or distortion of the output signal in response to the spatial position and movement of the movable diaphragm device.

18. The device of claim 16 wherein the CMOS circuit is configured to apply electrostatic damping in response to the spatial position.

19. The device of claim 16 wherein the CMOS circuit is configured to apply active noise cancellation in response to the spatial position.

20. The device of claim 1 wherein the first substrate comprises a cap layer comprising a metal surface that is sputtered or deposited on an inside surface of the cap layer with an oxide layer between the metal surface and the cap layer such that the cap layer is electrically isolated from the metal surface, wherein the metal surface comprises the electrode device.

21. The device of claim 1 wherein the the springs are configured to restore the movable diaphragm device to an original position.

22. A system on a chip device, the device comprises:

a monolithically integrated speaker cell having a moving element diaphragm configured to create one or more audio frequencies, wherein the moving element diaphragm is formed from a silicon material, wherein the moving element diaphragm is coupled to a substrate via one or more cantilevers or springs, wherein one or more openings are formed through the silicon material, and wherein the one or more cantilevers or springs are formed from the silicon material by the one or more openings;

a CMOS integrated circuit configured to pre-processes an audio signal to output an electrostatic force on the moving element diaphragm and to integrate an audio processing circuit; and a cap layer coupled to the substrate and enclosing the monolithically integrated speaker cell for protection, and configured to generate an electrostatic force relative to the moving element diaphragm.

23. The system of claim 22 wherein the audio processing circuit includes an Analog to Digital Conversion (A/D).

24. The system of claim 22 wherein the audio processing circuit includes a Sigma Delta A/D conversion to generate a one bit output.

25. The system of claim 22 wherein the audio processing circuit includes a Pulse Width Modulation (PWM) circuit.

26. The system of claim 22 wherein the audio processing circuit is configured to generating one or more high voltage pulses from a first voltage to a second voltage.

27. The system of claim 22 wherein the audio processing circuit is configured for generating a plurality of pulses to provide voltage to one or more electrodes and for the cap layer.

28. The system of claim 22 wherein the CMOS integrated circuit comprises a charge pump to boost voltage from a lower supply voltage to a desired higher voltage.

29. The system of claim 22 wherein the CMOS integrated circuit comprises a charge pump to boost voltage from a low voltage to a desired high voltage and zero or positive voltage to a negative desired high voltage.

30. The system of claim 22 wherein the audio processing circuit includes an analog filtering circuit.

31. The system of claim 22 wherein the audio processing circuit includes a digital filtering circuit.

32. A system on a single monolithic integrated chip device, the device comprising:

a speaker cell comprising a moving element diaphragm to create one or more audio frequencies, wherein the moving element diaphragm is formed from a silicon material, wherein the moving element diaphragm is coupled to a substrate via one or more cantilevers or springs, wherein one or more openings are formed through the silicon material, and wherein the one or more cantilevers or springs are formed from the silicon material by the one or more openings;

a CMOS device configured to pre-process an audio signal and configured to generate a signal to electrostatically apply a force coupled to the moving element diaphragm, the CMOS device further comprising one or more circuits configured for audio processing;

a microphone cell coupled with the moving element diaphragm to generate a capacitive change;

a sense amplifier configured with the moving element diaphragm to detect a magnitude of the capacitive charge;

an analog to digital converter configured to sense a motion of the moving element diaphragm and generate a sense signal; and a feedback circuit coupled to the analog to digital converter and configured to detect the sense signal and the audio signal to reduce a non-ideal behavior of the audio signal.

33. The system of claim 32 wherein the feedback circuit is configured to reduce the non-ideal behavior comprising a reduce harmonic distortion.

34. The system of claim 32 wherein the feedback circuit is configured for active noise cancellation.

35. A speaker device comprising:

a MEMS actuator layer configured to function as a movable diaphragm device coupled to at least one spring and an electrode material comprising at least one electrode device, the electrode device configured to electrostatically move the movable diaphragm device an encapsulation region comprising a cap configured to form an upper region over the movable diaphragm device, and configured to form an electrostatic force to move the movable diaphragm device;

a sense electrode provided overlying a first substrate or a second surface to determine a spatial position of the movable diaphragm device;

a CMOS integrated circuit coupled to the first substrate and coupled to the sense electrode to use a capacitance from the sense electrodes to proportionately drive the movable diaphragm device with an accumulated capacitive charge such that a magnitude of an applied electrostatic force is compensated as the movable diagram device moves spatially closer in distance to the electrode device thereby increasing a dynamic range from a first predetermined value to a second predetermined value and a pull in range from a first value to a second value of the movable diaphragm device, wherein the accumulated charge is configured from a spatial geometry of the movable diaphragm device and the sense electrode.

36. The device of claim 35 wherein the capacitance from the sense electrode proportionately scales the charge applied to the movable diaphragm device to extend the dynamic range of movable diaphragm and prevent pull in of the movable diaphragm.

37. The device of claim 35 wherein the CMOS integrated circuit comprises a fully differential circuit to reduce noise from a first level to a second level.

38. The device of claim 35 wherein wherein the MEMS actuator layer comprises a silicon material having a thickness within a range of 0.1 nm to 10 microns.

39. The device of claim 35 wherein the CMOS integrated circuit comprises a plurality of op-amps to reduce effect of parasitic current.

40. The device of claim 35 wherein the movable diaphragm device is driven using a switched capacitor configuration.

* * * * *